(12) United States Patent
Ferris et al.

(10) Patent No.: US 10,737,781 B2
(45) Date of Patent: Aug. 11, 2020

(54) THREE-DIMENSIONAL PATHWAY TRACKING SYSTEM

(71) Applicant: DRONE RACING LEAGUE, INC., New York, NY (US)

(72) Inventors: Nate Ferris, New York, NY (US); Phil Herlihy, New York, NY (US); Trevor Smith, New York, NY (US); Ryan Gury, New York, NY (US)

(73) Assignee: Drone Racing League, Inc., New York, NY (US)

( * ) Notice: Subject to any disclaimer, the term of this patent is extended or adjusted under 35 U.S.C. 154(b) by 85 days.

(21) Appl. No.: 15/704,794

(22) Filed: Sep. 14, 2017

(65) Prior Publication Data

US 2019/0077507 A1  Mar. 14, 2019

(51) Int. Cl.
| | |
|---|---|
| *B64C 39/02* | (2006.01) |
| *H04N 17/00* | (2006.01) |
| *G01C 5/00* | (2006.01) |
| *G01S 5/02* | (2010.01) |
| *A63H 27/00* | (2006.01) |

(Continued)

(52) U.S. Cl.
CPC ........... *B64C 39/024* (2013.01); *A63H 18/02* (2013.01); *A63H 27/12* (2013.01); *G01C 5/00* (2013.01); *G01S 5/0036* (2013.01); *G01S 5/0252* (2013.01); *G01S 5/0294* (2013.01); *G01S 5/14* (2013.01); *H04N 17/004* (2013.01);

(Continued)

(58) Field of Classification Search
CPC ............ B64C 39/024; B64C 2201/127; B64C 2201/146; A63H 18/02; A63H 27/12; G01C 5/00; G01S 5/0036; G01S 5/0252; G01S 5/0294; G01S 5/14
USPC ......................................................... 701/519
See application file for complete search history.

(56) References Cited

U.S. PATENT DOCUMENTS

| | | |
|---|---|---|
| 4,753,400 A | 6/1988 | Reuter et al. |
| 5,949,498 A | 9/1999 | Rudolph |

(Continued)

FOREIGN PATENT DOCUMENTS

| | | | | |
|---|---|---|---|---|
| EP | 2381270 A1 | * | 10/2011 | ........... G01S 13/878 |
| GB | 2476149 A | | 6/2011 | |

(Continued)

OTHER PUBLICATIONS

Patwari N., et al., "Relative Location in Wireless Networks," Connecting the Mobile Word; IEEE VTS 53rd Vehicular Technology Conference, vol. CONF. 53, May 2001.

(Continued)

*Primary Examiner* — Tuan C To
(74) *Attorney, Agent, or Firm* — Vierra Magen Marcus LLP

(57) ABSTRACT

Techniques are described for tracking and determining a three dimensional path travelled by controlled unmanned aircraft (i.e. drones) or other moving objects. By monitoring the strength of communication signals transmitted by an object, the strength of control signals received by the object, and altitude data generated by the object, its three dimensional path is determined. For example, these techniques can be applied to racing drones to determine their positions on a course. An end gate structure for such a course that can automatically transmit disable signals to the drones upon completing the course is also described.

20 Claims, 15 Drawing Sheets

(51) Int. Cl.
  *G01S 5/14* (2006.01)
  *A63H 18/02* (2006.01)
  *G01S 5/00* (2006.01)
  *G05D 1/00* (2006.01)

(52) U.S. Cl.
  CPC .. *B64C 2201/127* (2013.01); *B64C 2201/146* (2013.01); *G05D 1/0038* (2013.01)

(56) References Cited

U.S. PATENT DOCUMENTS

| | | |
|---|---|---|
| 5,986,635 A | 11/1999 | Naka |
| 6,084,931 A | 7/2000 | Powell, II |
| 6,175,600 B1 | 1/2001 | Guillemain |
| 6,308,085 B1 | 10/2001 | Shoki |
| 6,519,206 B1 | 2/2003 | Martin et al. |
| 6,654,432 B1 | 11/2003 | O'Shea |
| 7,193,384 B1 | 3/2007 | Norman et al. |
| 7,315,733 B2 | 1/2008 | Ohsuge |
| 7,428,022 B2 | 9/2008 | Teichner |
| 8,218,092 B1 | 7/2012 | Cohen |
| 8,259,029 B2 | 9/2012 | Abdelgany |
| 8,352,040 B2 | 1/2013 | Arx |
| 8,380,222 B2 * | 2/2013 | Alles ................ G01S 5/06 455/456.1 |
| 8,489,122 B2 * | 7/2013 | Gravely ............. G01S 5/14 455/456.1 |
| 8,505,086 B2 | 8/2013 | Norman et al. |
| 8,878,725 B2 * | 11/2014 | Lu .................... G01S 1/04 342/450 |
| 8,965,303 B2 | 2/2015 | Yang |
| 9,818,303 B2 * | 11/2017 | Kotecha ............ G08G 5/0034 |
| 2002/0008778 A1 | 1/2002 | Grigorian |
| 2002/0050992 A1 | 5/2002 | Deering |
| 2002/0150185 A1 | 10/2002 | Meehan |
| 2003/0204850 A1 | 10/2003 | Ng |
| 2004/0027276 A1 * | 2/2004 | Herman ............. G01S 5/06 342/181 |
| 2005/0243219 A1 | 11/2005 | Yun |
| 2006/0077297 A1 | 4/2006 | Sonobe |
| 2007/0146550 A1 | 6/2007 | Ikuma |
| 2007/0174891 A1 | 7/2007 | Gouhara |
| 2008/0122957 A1 | 5/2008 | Wu |
| 2008/0156546 A1 | 7/2008 | Hauck |
| 2008/0253761 A1 | 10/2008 | Mizuguchi |
| 2008/0311874 A1 | 12/2008 | Hoffmeister |
| 2009/0033555 A1 | 2/2009 | Niu |
| 2009/0212995 A1 | 8/2009 | Wu et al. |
| 2009/0257487 A1 | 10/2009 | Wang |
| 2011/0143673 A1 | 6/2011 | Landesman |
| 2011/0143772 A1 * | 6/2011 | Sridhara ............ G01S 5/0252 455/456.1 |
| 2011/0254125 A1 | 10/2011 | Nomasaki |
| 2011/0269478 A1 | 11/2011 | Das et al. |
| 2012/0015665 A1 | 1/2012 | Farley et al. |
| 2012/0176550 A1 | 7/2012 | Hendrickson |
| 2012/0309288 A1 * | 12/2012 | Lu ..................... H04K 3/45 455/1 |
| 2012/0317302 A1 | 12/2012 | Silvestri |
| 2013/0050486 A1 | 2/2013 | Omer |
| 2013/0150012 A1 | 6/2013 | Chhabra |
| 2014/0071967 A1 | 3/2014 | Velasco |
| 2014/0181272 A1 | 6/2014 | Abrams |
| 2014/0192262 A1 | 7/2014 | Takano |
| 2014/0266910 A1 * | 9/2014 | Gates ............... G01S 19/42 342/458 |
| 2015/0241545 A1 * | 8/2015 | Lehtomaki ......... G01S 3/14 342/417 |
| 2016/0036957 A1 * | 2/2016 | Van Meter, II ..... H04W 4/14 455/557 |
| 2016/0291589 A1 | 10/2016 | Ashoori et al. |
| 2016/0371985 A1 * | 12/2016 | Kotecha ............ G08G 5/0034 |
| 2017/0003376 A1 * | 1/2017 | Wellman ........... G01S 5/0221 |
| 2017/0264381 A1 * | 9/2017 | Mengwasser ...... G01S 1/68 |
| 2018/0036632 A1 | 2/2018 | Poynter et al. |
| 2018/0109284 A1 * | 4/2018 | Hadani .............. H04L 1/0071 |
| 2018/0294871 A1 * | 10/2018 | Kosseifi ............ H04B 7/18506 |
| 2018/0372830 A1 | 12/2018 | Schuehler et al. |
| 2019/0066504 A1 | 2/2019 | Zaloom et al. |

FOREIGN PATENT DOCUMENTS

| | | |
|---|---|---|
| GB | 2546438 A | 7/2017 |
| WO | WO2005041566 A3 | 5/2005 |
| WO | WO2017/008276 A1 | 1/2017 |

OTHER PUBLICATIONS

International Search Report & The Written Opinion of the International Searching Authority dated Nov. 27, 2018.
International Search Report & The Written Opinion of the International Searching Authority dated Nov. 23, 2018.
Non-final Office Action dated May 8, 2019, U.S. Appl. No. 15/704,809, filed Sep. 14, 2017.
U.S. Appl. No. 15/704,809, filed Sep. 14, 2017, by Ferris et al.
Cox, "Universal Digital Portable Radio Communications," Proceedings of the IEEE, New York, USA, vol. 75, No. 4, Apr. 1, 1987.
Simunek, et al., "Space Diversity Gain in Urban Area Low Elevation Links for Surveillance Applications," IEEE Transactions on Antennas and Propagation, IEEE Service Center, Piscathaway, NJ, US, vol. 61, No. 12, Dec. 1, 2013.
Response to Office Action dated Aug. 7, 2019, U.S. Appl. No. 15/704,809, filed Sep. 14, 2017.
Final Office Action dated Nov. 14, 2019, U.S. Appl. No. 15/704,809, filed Sep. 14, 2017.
Non-final Office Action dated Apr. 14, 2020, U.S. Appl. No. 15/704,809, filed Sep. 14, 2017.

* cited by examiner

THREE-DIMENSIONAL PATHWAY TRACKING SYSTEM

BACKGROUND

Accurately tracking the three-dimensional path of a high-speed radio controlled unmanned aircraft (i.e. drones) or other moving objects along a course is a complex task. As such radio controlled unmanned aircraft can move at high speed and make rapid changes in direction while traveling along a course, providing accurate path information in real time can be difficult. This task is complicated in applications, such as for racing drones, where it is important to keep the weight of the object down, so that the amount of tracking elements on the object are kept to a minimum.

DETAILED DESCRIPTION

Figure 1A:
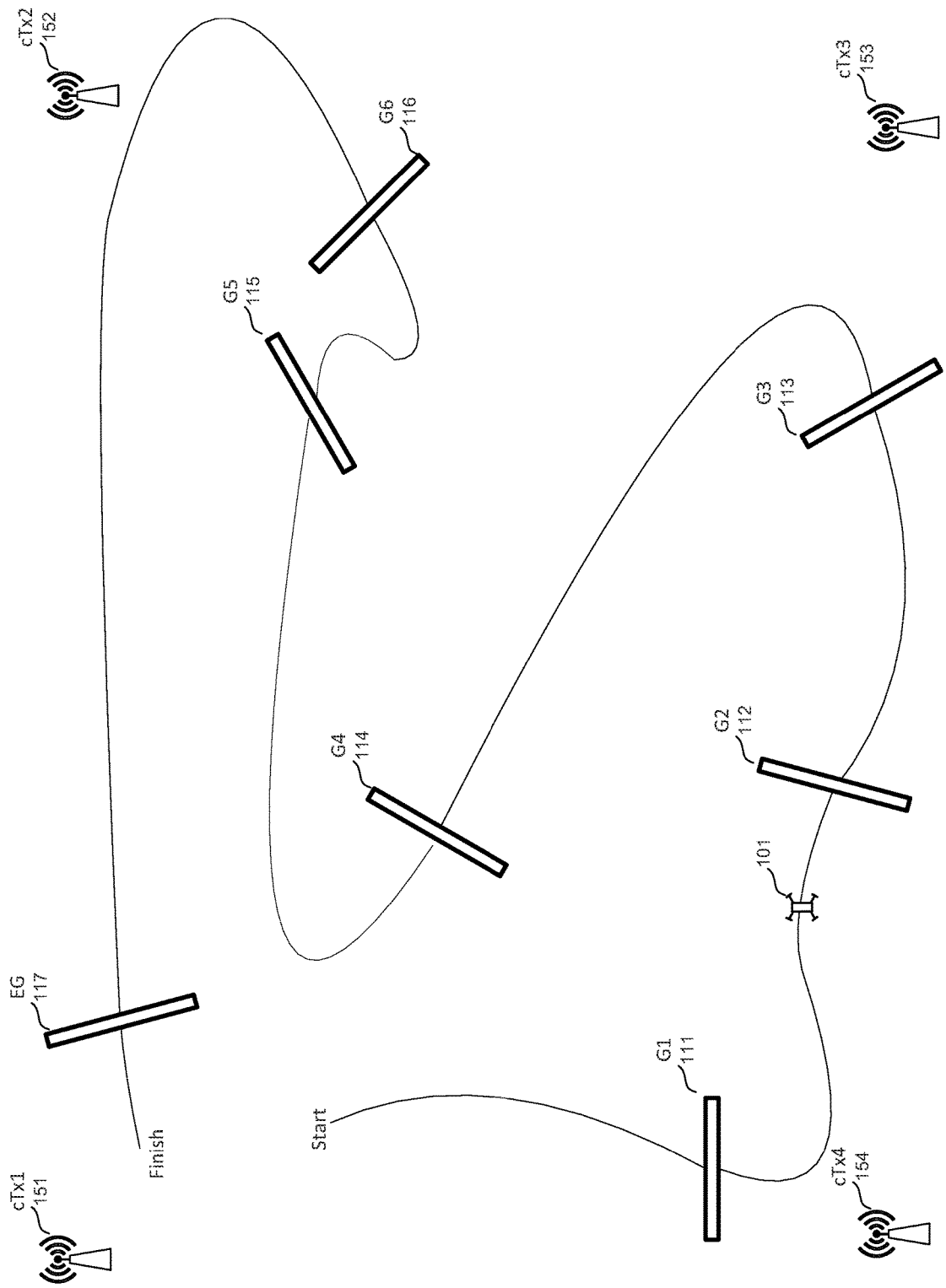
FIG. 1A is a top view of an example of a course and a drone moving along a path through the course.

The following presents a system and techniques for automatically determining the three-dimensional path of an object. The primary examples discussed are high-speed radio controlled unmanned aircraft (i.e. drones), but the techniques can be applied more generally. The three-dimensional path is determined by a combination of signals. A first radio system monitors a communication signals transmitted by the object as it travels along the course. A second radio system transmits control signals to the object, which sends back an indication of the strength of the received signal. These two radio signals are combined with altitude data from sensors on the object that is transmitted by the object to determine its path.

For the drone example, the first radio system can be from a series of gates that the drone passes through as it travels along a course. The drone transmits a video signal and the first radio system monitors the received signal strength intensity of the video signal from the drone as it passes through the gate. The second radios system can use a set of transceivers that cover a region that includes the course and are used to transmit control signals to the drone. The drone can record the received signal strength intensity of the control signals and transmit these transceivers. The two sets can then be combined with data from an altitude sensor on the drone, such as an infrared or ping sensor or barometer, to determine the drone's three-dimensional path as it travels through the course.

The course can also include an end gate that includes a mesh net or other capture structure for when a drone completes a course. The end gate has an associated video or other control signal monitoring system and, based on the intensity of the received signal, the tracking system determines that a drone has been captured by the end gate structure and automatically transmits a disable signal for the drone, causing the drone to shut down and cease flying.

Although the following description is primarily given the context of drones moving along a three-dimensional path through a course, the concepts presented can be applied more generally. For example, the systems and techniques can be applied to non-drone aircraft or other objects that serve as a mobile source of the described signals as it moves along a three-dimensional path.

Considering the example of a drone tracking system, more specifically the example of racing drones, further, it useful to be able to track a drone's position during a race. Data from a drone tracking system can be useful for multiple applications such as displaying racer positions, lap-counting, crashed drones, drone out of bounds, safety precautions and much more. Data collectors can be used at various placements within a course to collect data from the drones, with the collected data stored, used live, or both, as an event proceeds. The tracking system can start when a race begins. Drones would fly throughout a course for a given amount of time, during which the pilots and observers can be aware of every drone's position, and placement in regard to the competitive standings, as well as a drone's physical location as it moves along a path on the course.

Embodiments for the tracking system can use multiple trackers, to be mounted on or near a timing gate. Multiple timing gates can be placed around the course to monitor checkpoints passed in a path along a course. Embodiments of the system can use a communication signal, such as video signal, specific to a drone (such as of a specific frequency) to identify a drone. Based on its frequency, the system can detect when a specific drone passes through a timing gate. Timing measurements can be recorded at each gate, similar to how a lap counter works. The timing gate data can be used in a number of ways. For example, the timing data can be used to determine the placement of each pilot ($1^{st}$, $2^{nd}$, $3^{rd}$ etc.) to show pilots and viewers who is in what place during a live race. Additionally, the path of the drones can be shown along a map or representation of a course to give viewers for a live feed of position within the course.

FIG. 1A is a top view of an example of a course and a drone moving along a path through the course. From the start location, the course passes through the gates G1-G6 111-116 sequentially and then through an end gate EG 117 to arrive at the finish location. The drone 101 is shown moving along the shown path through the series of gates, which will monitor the drone's position and time as they pass through the gate. Various embodiments for the end gate EG 117 are discussed further below. A set of control transceivers cTx1-4 151-154 cover the region that includes the course to supply control signals to drones on the course and also receive data back from the drones, as discussed further below.

Figure 1B:
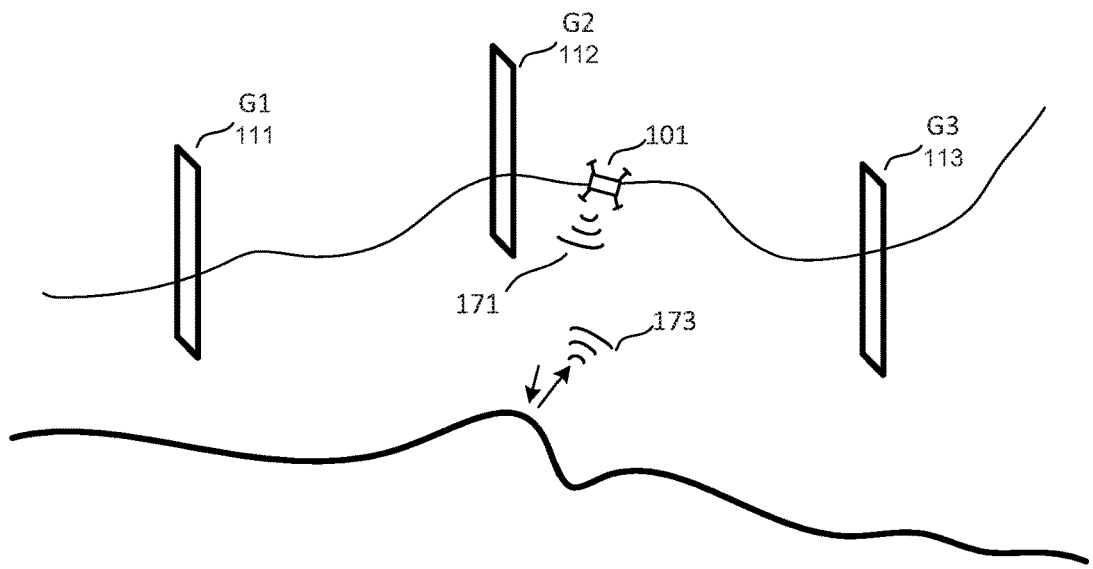
FIG. 1B is a side view of a portion of the course from FIG. 1A.

FIG. 1B is a side view of a portion of the course from FIG. 1A for gates G1-G3 111-113, where the circles inside the gates shown where the path of the drone 101 passes through the plane of the gate. As shown, the gates can be at differing heights, so that both the course and the path need not be planar as they appear in FIG. 1A. The drone is shown emitting a signal 171 from an altitude sensor, which bounces back at 173 and can be used by the drone to determine its altitude, as is discussed further below.

Figure 1D:
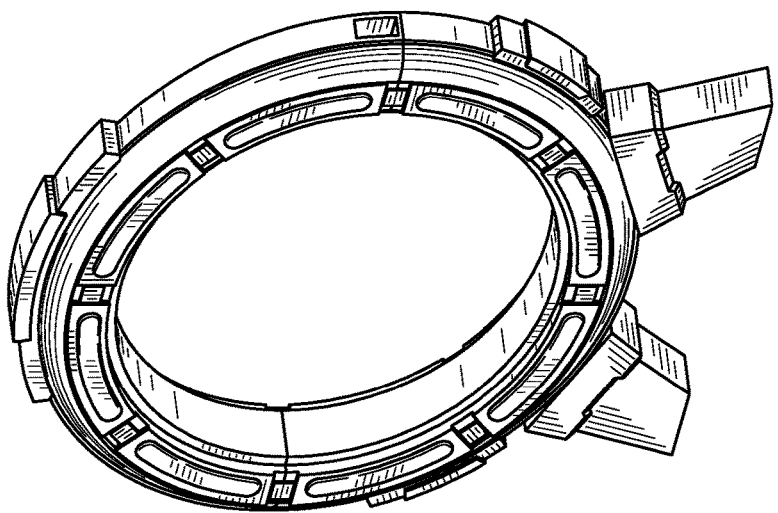
FIGS. 1C-1G provide a more detailed representation of some embodiments for the gate structure that could be used in a drone racing course.
Figure 1C:
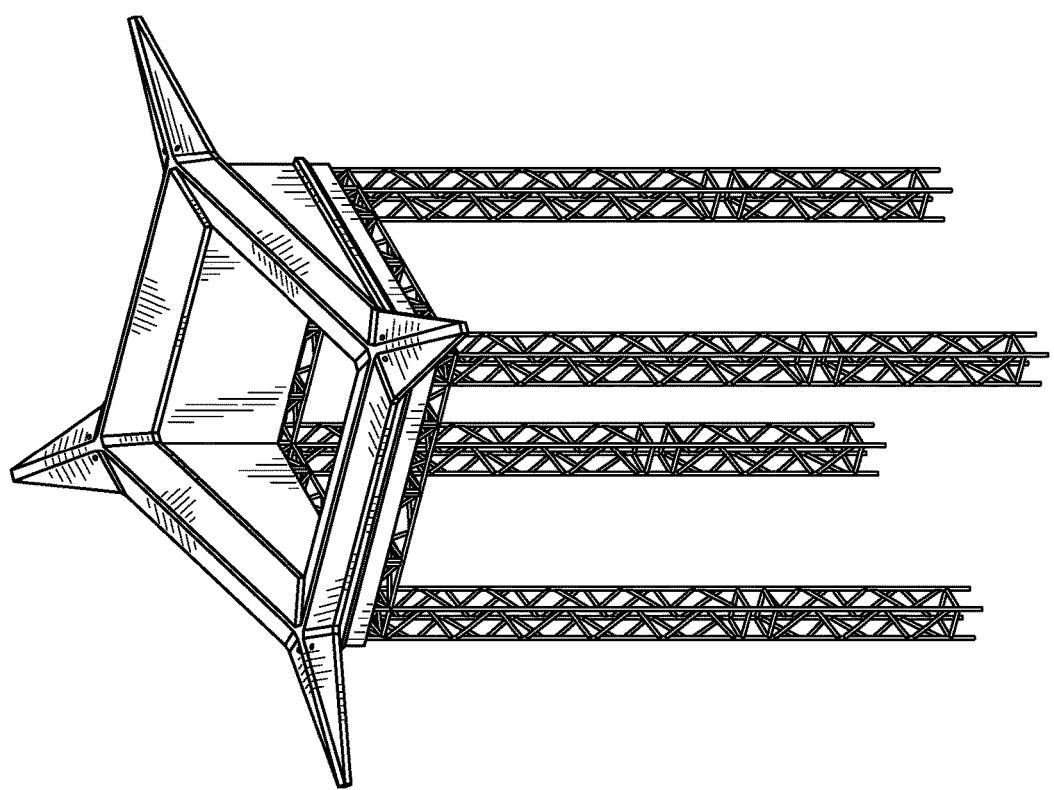
Figure 1G:
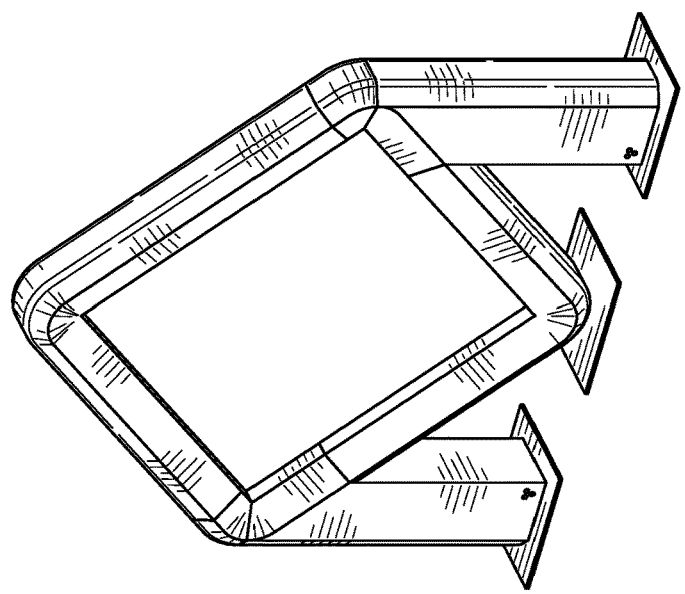
Figure 1F:
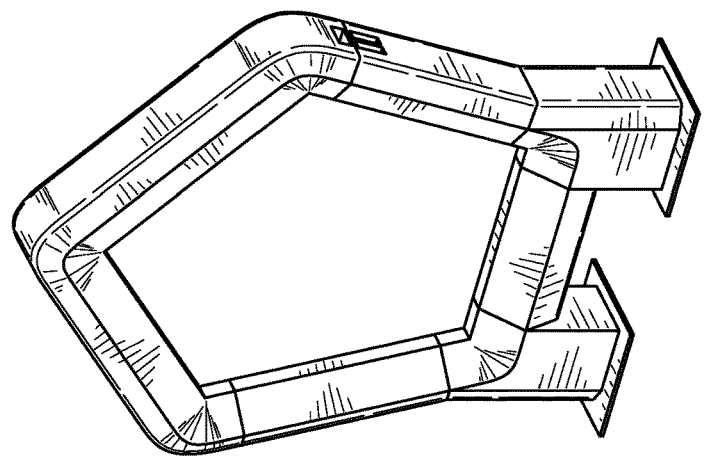
Figure 1E:
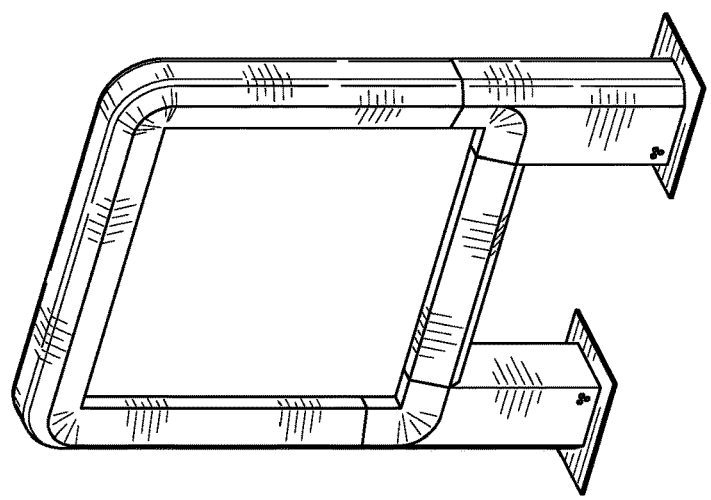

FIGS. 1C-1G provide a more detailed representation of some embodiments for the gate structure that could be used in a drone racing course. The embodiment of FIG. 1C illustrates a square gate on a tower structure. To pass through the gate of the embodiment of FIG. 1C, the drone would need to move vertically as well as travel horizontally, so that a drone's path would not lie in single x,y plane. The embodiments of FIGS. 1D-1G respectively illustrate a gate with a round, square, pentagonal, and diamond shaped cross-section through which a drone could travel horizontally, but which can be arranged at different heights and angles relative to the ground to create a three dimensional course.

Figure 2:
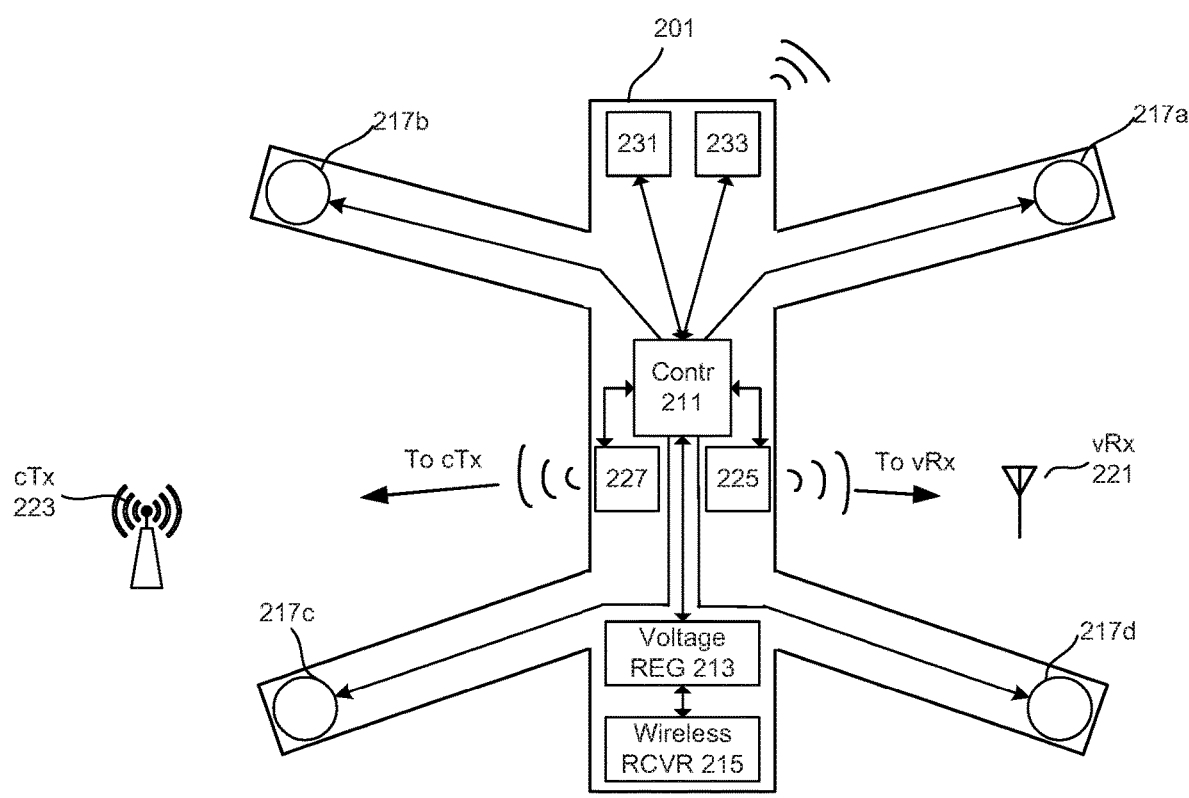
FIG. 2 is simplified representation of some of the components for one embodiment of a drone.

FIG. 2 is simplified representation of some of the components for one embodiment of a drone 201. FIG. 2 shows controller 211 connected to propellers 217a-d, the voltage source and regulator 213, wireless receiver 215, video camera 231 and altitude sensor 233, and the transmitters 225 and 227. In this embodiment, extending on an arm from each of the corners of the drone is a propeller 217a-d, each of which is controlled by the controller 211. A voltage source and regulator 213 supplies power. A pilot's commands are transmitted from control signal transceivers such as cTx 223, received by wireless receiver 215. The controller 211 then uses power from the voltage source 213 to drive the propellers 217a-d according to the pilot's signals.

The drone also includes video camera 231 and altitude sensor 233 that supply data to the controller 211. An FM or other type video transmitter 225 transmits data from the video camera 231 to a video monitor receiver vRx 221 (external to the drone, such as on the ground) that monitors the video signals and passes on the video data to the pilot. Data can also be sent back to the control signal transceiver cTx 223 by the transmitter 227. Although the transmitter 227 and wireless receiver 215 are shown as separate elements in FIG. 2, in many embodiments these will part of a single transceiver module. The received signal strength intensity (RSSI) at the of the video signal at video monitor receivers associated with the gates can be combined with data on the received signal strength intensity for control signals received at the wireless receiver 215 and altitude sensor 233 to determine the three-dimensional path of the drone along a course. As discussed further below, the received signal strength intensity for control signals be can transmitted back to the control signal transceivers, as can the altitude data in some embodiments.

Figure 3:
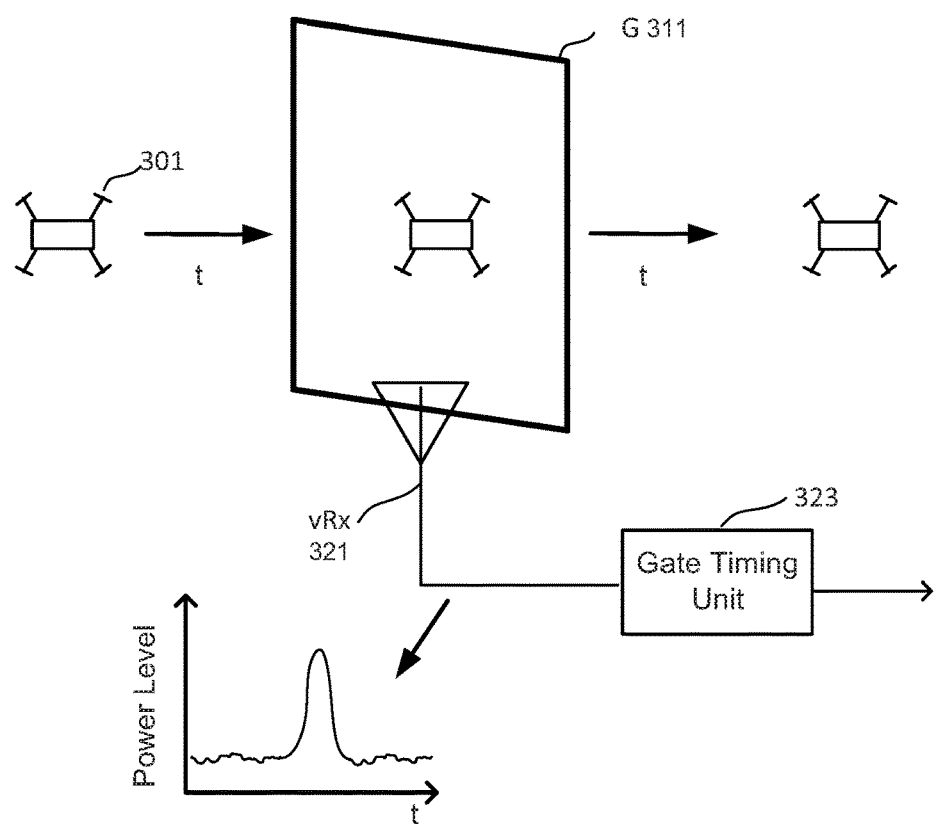
FIG. 3 illustrates a drone passing through a gate and the gate's associated communication signal monitor.

Each drone can transmit a video data signal at a corresponding frequency, which a receiver monitors to determine the received intensity of these signals. The receiver can be designed in such a way that it can account for multiple transmit frequencies simultaneously. Such a receiver will be placed on each timing gate in order to track the overall positions of the active drones. FIG. 3 illustrates a drone 301 passing through a gate G 311 and the gate's associated communication signal monitor. As a drone 301 passes through a gate G 311, an antenna for a communication signal monitor vRx 321 will receive a signal at a specific frequency and power level. This is represented at lower left, showing the power level of the received signal over time as the drone passed through the gate. Based on the width and amplitude of this received pulse, the drone's speed and recorded time can be calculated by the gate timing unit 323. Although represented separately in FIG. 3 and following figures, the communication signal monitor vRx 321, gate timing unit 323, or both can be within the frame of gate structures, such as those shown in FIGS. 1C-1G. This data can be time stamped for comparison with other tracking data. Note that only the intensity of the signal is being tracked for this purpose and the video does not require demodulating or decoding at this point. By using multiple timing gates, a drone's path can be tracked throughout the course based on the number of gates it has completed. The speed and recorded time can also be used to determine the position of each drone during the race, and along with the position each drone finishes with.

Although the start and finish of the course shown FIG. 1A are shown as near each other, this need not be so in general. Similarly, although the course is shown defined by a series of frame-like gates which are each associated with a video signal receiver, pylons or other structures can be used to specify a course or path; alternately, a region can be covered with a set of receivers to monitor the video signals, but which are not along a pre-established course. Additionally, although the main examples discussed here use a video signal, other embodiments can use other communication signals transmitted by the drone or other object as it moves along a path through a course.

Figure 4:
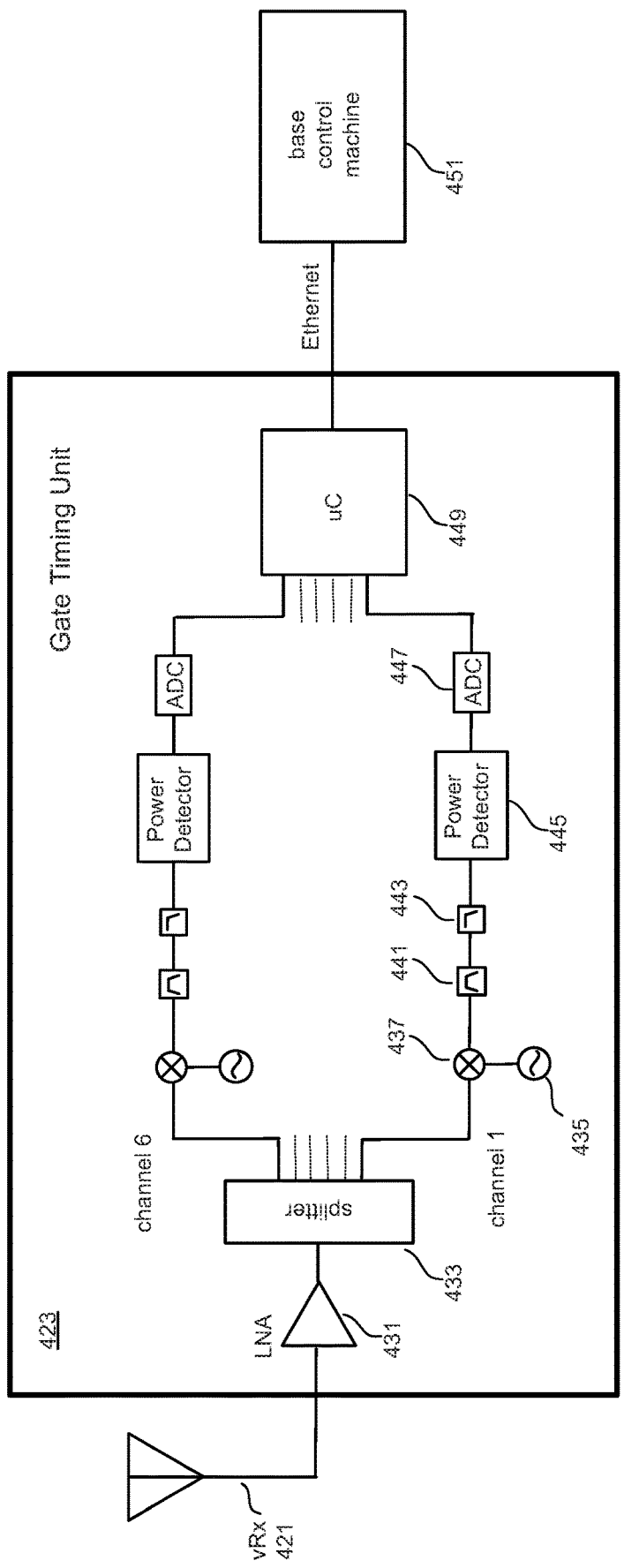
FIG. 4 is a block diagram for one embodiment of a drone tracking or timing unit that can be used with a gate's associated communication signal monitor.

FIG. 4 is a block diagram for one embodiment of a drone tracking or timing unit 423 as connected to communication signal receiver vRx 421 whose antenna is located at or near an associated gate, such as shown associated with gate G311 in FIG. 3 as vRx 321 and gate timing box 323. In this embodiment, the processing circuitry of unit 423 has 6 channels of down conversion, filtering, RF Detection, and Analog to Digital Conversion. A low noise amplifier LNA 431 is connected to receive the signal from the antenna vRx 421 monitoring the drones' video signals. A splitter 433 separates the signal into channels 1-6. The signal for each channel then goes to a mixer 437 that also receives a signal from a local oscillator signal 435 for down conversion. The signal then is filtered by narrow band pass filter 441 and a low pass spur filter 443, after which the signal goes to a power detector 445. The output of the power detector 445 then goes through an analog-to-digital converter ADC 447. All channels submit a DC value from the corresponding ADC 447 to a Microcontroller uC 449. The Microcontroller uC 449 for each gate communicates with a base control machine 451, via Ethernet cable for example, where programs are executed and run. A system can have many such timing units across the course, along with Ethernet cables running from timing units to the base control machine 451. The shown embodiment of the gate timing unit 423 does decode the video or other communication signal, but only monitors its power. The decoding can be performed separately or the power detection functions can be performed by processing circuitry that also incorporates decoding, depending on the embodiment.

Each gate (or, more generally, pylon or other communication signal monitor) in a course has a tracking or timing unit paired with it. Timing units can detect each of the different video transmitter frequencies. For these purposes, it is not needed to decode the signal, only to detect when and at what power level a drone passes through a gate and its timing unit. The six channels inside a unit can be the same in hardware, where a UART (universal asynchronous receiver/transmitter) programmable synthesizer acts as a local oscillator to tune each channel according to hardware, dropping the signal from the RF range down into the intermediate frequency range. Although FIG. 4 illustrates an embodiment for 6 channels, other embodiment can of course use other numbers.

Figure 5A:
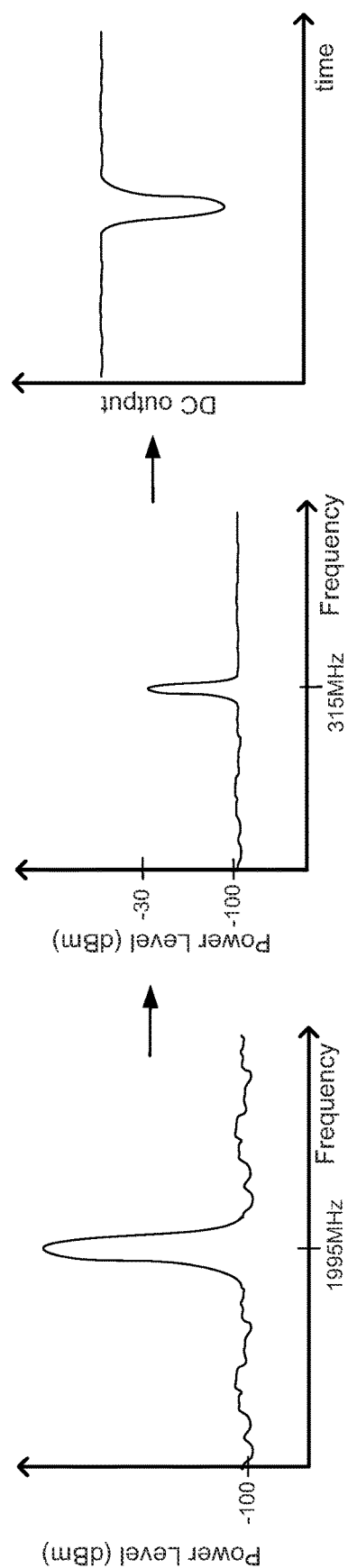
FIG. 5A illustrates the input and output of the gate timing unit of FIG. 4.
Figure 5B:
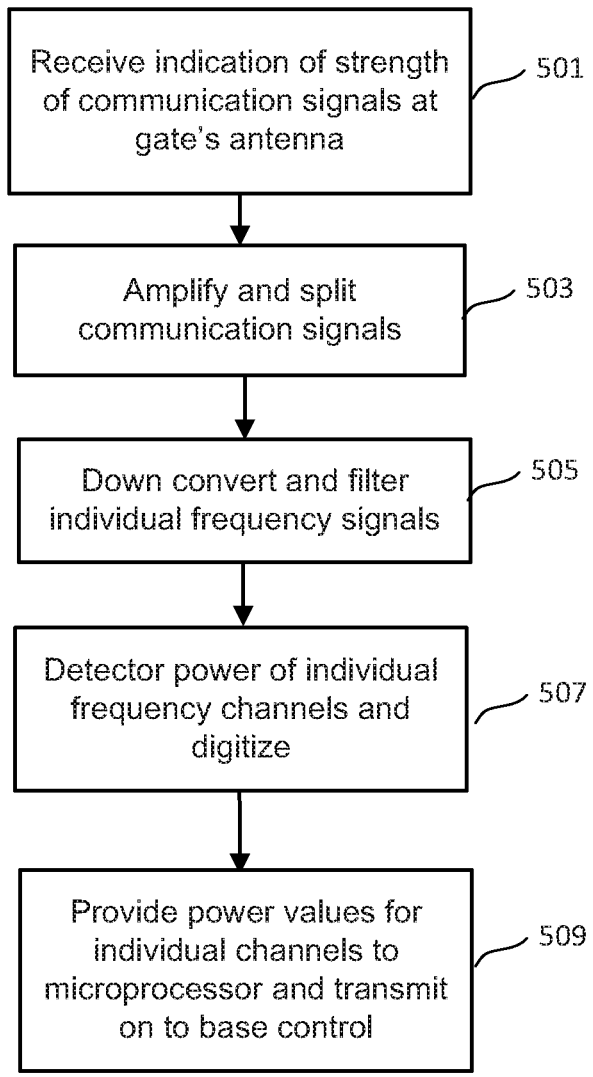
FIG. 5B is a flowchart describing one embodiment for the operation of the gate timing unit of FIG. 4.

As the drones fly through the course, they are detected via the timing units, the RF signal from the video transmitter is received, downconverted to an intermediate frequency, filtered, and passed through an RF Power Detector where the RF value is converted to a DC value. In one embodiment, the power detector has a dynamic range from −60 dBm to +5 dBm which translates to a DC scale of 2.2 VDC to 0.4 VDC. FIG. 5A illustrates the input, an internal level, and an output of the gate timing unit 423 of FIG. 4, where the DC output is converted into a digital signal via an ADC 447. FIG. 5B is a flowchart describing one embodiment for the operation of the gate timing unit 423 of FIG. 4.

At left, FIG. 5A shows the signal from the antenna 421 seen at the input of the gate timing unit 423 in terms of power level versus frequency, corresponding to the power level versus time trace shown at bottom left of FIG. 3. These power levels indicate the strength of the communication signals seen at the gate's corresponding antenna, as received at the gate timing unit 423 at step 501 of FIG. 5B. The input sign is then amplified by the low noise amplifier 431 and split into the different frequency components for the different drones by the splitter 433 at step 503. The split frequency components are then down-converted by elements 435 and 437 and filtered by filters 441 and 443 at step 505. At the center of FIG. 5A is the down-converter and filtered version of the signal as input into the power detector 445. Both the left and center traces of FIG. 5A are frequency versus power. In this example, the signal for the drone from the antenna is at an RF frequency of 1995 MHz, which is then down converted to an intermediate frequency of 315 MHz. In the situation of multiple drones on the same course at the same time, as during a race, each drone can be assigned a different RF frequency.

At step 507, the down converted and filtered signal for each channel then goes to the corresponding power detector 445 and ADC at 447. At right, FIG. 5A shows the corresponding DC signal output from the power detector 445. In one embodiment, at rest the RF Power detector observes the noise floor and outputs 2.2 VDC. If a drone were to stand still next to the tracking unit, that changes to a stable value of around 0.5 VDC depending on distance. When a drone passes through a gate at any velocity, a "peak" of power over time is recorded. This received power can be used to calculate how far a drone is from a given gate. The digitized power values for each channel are sent to the microprocessor 449 and then transmitted on to base control 451 at step 509.

As a drone or other object acting as a signal source moves along a path, distance computations based on the communication signals and control signals can be used to establish the two-dimensional location of the object. To more accurately determine the three dimensional path, an altitude sensor can be used to provide altitude data. For the drone example, this is illustrated by the altitude sensor 223 in FIG. 2, which can emit a signal as shown at 171 of FIG. 1B, which bounces back at 173.

Embodiments for the altitude sensor can include an infrared (IR) sensor. IR sensors operate like a basic radar. There are two core components: the IR transmitter LED and the IR receiver (photo-sensor). The transmitter LED sends out IR light and the photo sensor receives the light reflected. The amount of light and the time it takes for this light to return determines the distance away an object is from the ground. When collecting data, the IR sensor can operate in a continuous mode, with pulses sent at regular intervals.

Other embodiments for the altitude sensor can include a ping sensor. Similar to the IR sensor, the ping sensor consists of a transmitted and received pulse, but now using sound waves. A chirp is sent, an echo received and the delay reflects the distance to the ground. As with the IR sensor, a ping sensor works best when the transmitter and receiver of the signal are at a relatively narrow angle relative to the reflecting surface and there is little interference with the signal.

Additional embodiments for an altitude sensor can use a barometer, such as a digital pressure sensor. Barometers are used to measure barometric pressure. Knowing that pressure changes with altitude, this measurement can be translated into altitude. By monitoring the pressure, the sensor can plot altitude versus time, data which be combined with two-dimensional grid this data to more easily plot the path in three-dimensional space.

As different altitude sensors have different relative advantages and disadvantages, the choice of sensor can be selected based on the type of object and the type of course through which a drone or other object moves. In many embodiments, it can be useful to use more than one of these or other sensors for improved accuracy across different conditions. The altitude can be transmitted out periodically to the base station to be combined with the other location data. The system can use a separate set of receivers for the altitude data, or use others of the systems receivers, such as the control signal transceivers cTx. The attitude data can be transmitted periodically, along a time stamp, for use with the other data, where the data can either be raw data from the altitude sensor or be processed to some degree before transmitting.

Figure 6:
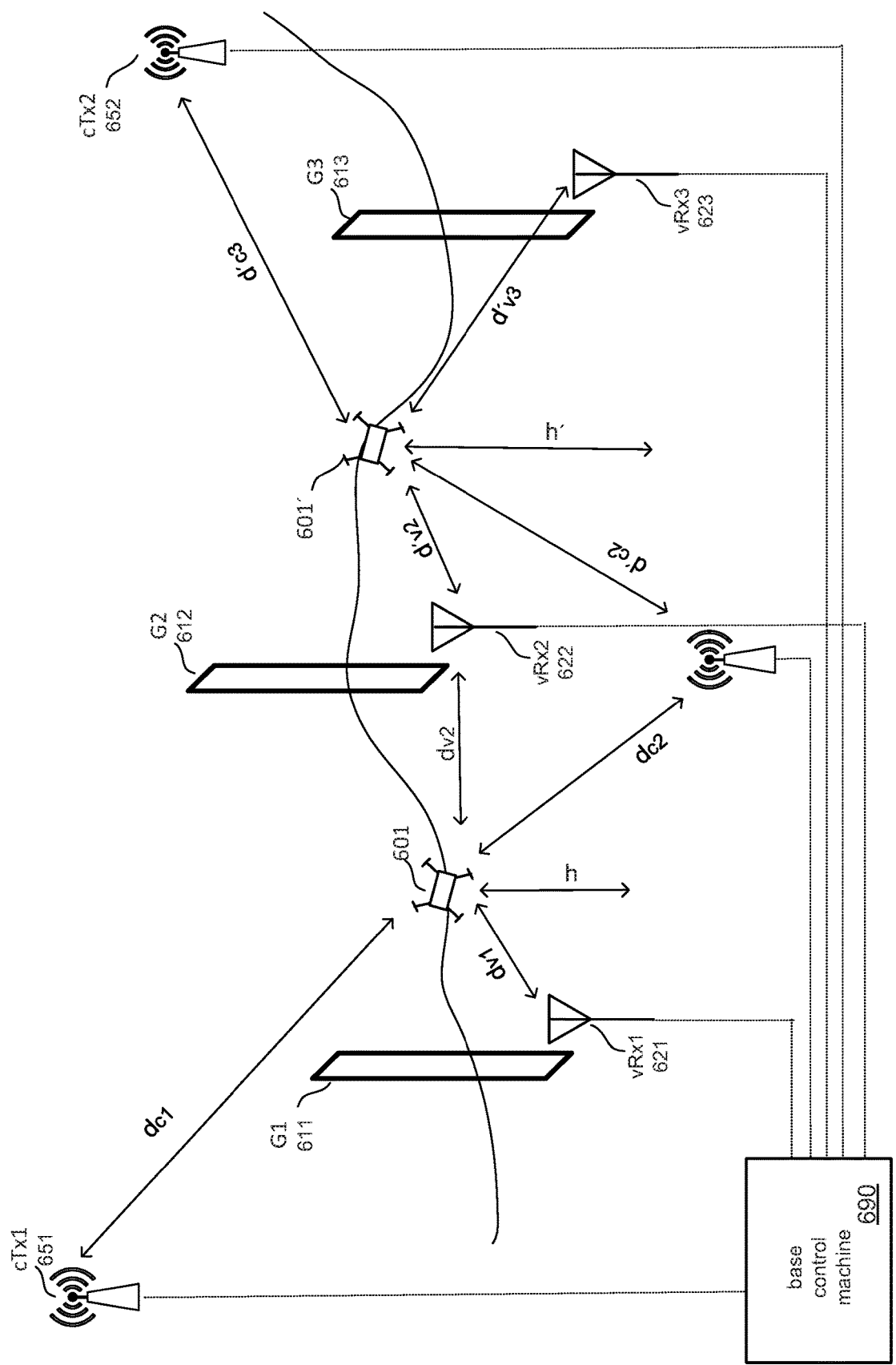
FIG. 6 is a side view of a drone moving along a three dimensional path through a course with gates.

To illustrate these different components used to determine a path, FIG. 6 illustrates a drone 301 moving along a path through a course with gates G1 611, G2 612 and G3 613 in a more detailed version of FIG. 1B showing the different signals used by the system to compute the path. Associated with each of the gates is a corresponding video or other communication signal monitor receiver vRx1 621, vRx2 622 and vRx3 623. The region containing the course is covered by a set of control transceivers cTx1 651, cTx2 652 and cTx3 653. A base control machine 690 is connected to the control transceivers and communication signal monitors, which use wireless or wired connections, such as through use of ethernet cable in the example of a drone racing course. As the drone 601 moves along the course, it can also collect altitude data, which can be transmitted to the base control machine 690 control transceivers cTx1 651, cTx2 652 and cTx3 653, although other embodiments can use a separate set of receivers. As the drone moves along a path, distance signals from these different sources can be combined to determine the drone's path.

At a time t, the drone 601 is between gate G1 611 and gate G2 612 and at respective distances $d_{v1}$ and $d_{v2}$ from corresponding communication monitor receiver vRx1 621 and vRx2 622. As the drone 601 moves along its path through these gates, the timing units from these gates send the distance information to the base control machine 690. The drone 601 records the received signal strength intensity of the control signals from the control transceivers cTx1 651 and cTx2 652 and transmits to the control transceivers (either the same or different one from which the control signal is received), and then is transferred on to the base control machine 690. In some embodiments, the strength of this return signal can also be used in the path determination. The drone 601 also determines the altitude data corresponding to the height h and transmits this to the base control machine 690.

At a time t', the drone 601' is between gate G2 612 and gate G3 613 and at respective distances $d'_{v2}$ and $d'_{v3}$ from corresponding communication monitor receiver vRx2 622 and vRx3 623. As the drone 601' moves along its path through these gates the timing units from these gates send the distance information to the base control machine 690. The drone 601' records the received signal strength intensity of the control signals from the control transceivers cTx2 652 and cTx3 653 and transmits to the control transceivers (either the same or different one from which the control signal is received), and then transferred on to the base control machine 690. In some embodiments, the strength of this return signal can also be used in the path determination. The drone 601' also determines the altitude data corresponding to the height h' and transmits this to the base control machine 690.

As the drone travels along its path, the distance from these different sources can be time stamped so that the base control machine 690 can combine the data from the different sources. The distance data from the communication monitor receivers (vRx) and control transceivers (cTx), combined with the altitude data, at the different times is used by processing circuits of the base control machine to establish the path. The processing circuitry of the base control machine can implement the determination of the path through software, hardware, firmware, or some combination of these, depending upon the embodiment. An embodiment for combining these signals is discussed below with respect to FIG. 10, following a discussion of some computation techniques for determining an objects location based on the signals described in FIG. 6.

There are several equations that incorporate sent/received signals, frequency, power, distance, and other factors that can be used by the system to calculate the distance a drone is from a gate. For example, a variation of the free space path loss equation can be modelled according to this system. Taking the drone as the transmitter and the antenna of the drone tracking unit as the receiver, a basic model for the distance calculation is as follows in equation (1):

$$\text{Path Loss}_{dB} = P_{Rx} - P_{Tx} = 20\log(d) + 20\log(f) + 20\log(4\pi/c) - G_{Tx} - G_{Rx}, \quad (1)$$

where:
$P_{Rx}$=Power of transmitted signal (dBm, dB, or dBW);
$P_{Tx}$=Power of received signal (dBm, dB, or dBW);
$G_{Tx}$=Gain of transmitter antenna (dBi);
$G_{Rx}$=Gain of receiver antenna (dBi);
d=distance between antennae;
f=frequency; and
c=speed of light ($\sim 3\times 10^8$ m/s).

The power of the drone's transmitter, frequency of operation, and gain of antennas used are known; and, as the drone flies through a gate, the power of the received signal is measured. Using this equation and the known parameters, the distance between the transmitter and receiver can be solved.

For example, say a drone passes through the gate with peak power observed at −10 dBm, transmitting at +25 dBm. The gain of the drones transmitting antenna is 2 dBi at best, while the receiving antenna is direction with a gain of 14 dBi. Then:

$$\text{Path Loss}_{dB} = P_{Rx} - P_{Tx} = 20\log(d) + 20\log(f) + 20\log(4\pi/c) - G_{Tx} - G_{Rx},$$

or, putting in values, $$-(-10\text{ dBm} - 25\text{ dBm}) = 20\log(d) + 20\log(1995\text{ MHz}) + 20\log(4\pi/c) - 2\text{ dBi} - 14\text{ dBi}.$$

This gives 12.56 dB=20 log(d), or d=4.24 meters. Consequently, in this example the drone flew within 4.24 meters of the antenna/gate. In an embodiment where gates are typically 3 meters×3 meters, adding a meter or two in for the antenna mounted near the gate and that value places the drone right in the gate.

Another method of distance calculation is the Friis Transmission Equation:

$$\frac{P_{Rx}}{P_{Tx}} = G_{Tx}G_{Rx}\left(\frac{\lambda}{4\pi d}\right)^2, \text{ or} \quad (2)$$

$$P_{Rx} = P_{Tx} - G_{Tx} - G_{Rx} + 20\log(\lambda/4\pi d).$$

Putting in the same values as above into equation 2 gives: −19 dB=20 log(0.0119d), or d=9.42 meters.

Both methods yield similar results, an average between the two yields a rounded result. Another approach could rely on comparing both results as a cross check. Of course, as this value tells how far the drone is from the antenna, it could be in front of or behind the gate. Incorporating additional data from the antennae of the control system will provide a finer resolution to a drone's location.

The region through which the course runs is covered by a system of control transceivers to transmit control signals to a drone as it travels on the course, as illustrated by the control transceivers cTx1-4 151-154 in FIG. 1A. The received signal strength intensity (RSSI) at the drone can be used to determine distance between the drone and static control towers placed around the region. These control towers are transceivers which cater to transmitting the pilots' control signals to the drones, controlling the drones. Telemetry data from drone back to the control radio can be used to send this RSSI value (as well as altitude sensor data) back to the base computer. The RSSI values can be time stamped for comparison with the distance data from the video signals.

The RSSI onboard computation by the drone is an interpretation of the power received. Typically, this value is the receiver's dynamic range, stretching from its sensitivity to maximum power input. Instead of looking at the raw values (e.g. −31.4 dBm) they can be integers from about −120 to 10 with a granularity of 1. In other words −120 dBm to 10 dBm with increments of 1 dBm.

Many commercial off the shelf receivers use basic RSSI equations like equation (3) below to determine distance from RSSI, which use similar parameters as the previous equations (1) and (2). In an embodiment of drone racing course, four control transceivers towers can be placed near the edges of the course, as illustrated by cTx1-4 151-154 in FIG. 1A. Other embodiments can use more or less numbers of such control transceivers as needed to sufficiently cover the course region.

A drone racing course can range in size, but an example may span a volume that can be several hundred meters in each direction. In this example, the transmit power $P_{Tx}$ is set at 30 dBm, typically resulting in an RSSI value is in a low range from −70 to −40. For this example, an RSSI of −60 is used. Fade margin $F_m$ and path loss exponent are factors that are dependent on the atmosphere. For example, rain and snow increase fade margin n as the signal is attenuated, while the path loss exponent sits around 2 in earth's atmosphere. These values will be around $F_m$=14 dB and n=2 given that DRL courses are indoors.

$$d = 10 \wedge \left[ \frac{P_{Tx} - F_m - RSSI - 10n\log(f) + 30n - 32.44}{10n} \right], \quad (3)$$

where:
d=distance (meters);
f=frequency (MHz);
n=path loss exponent, ~2 for earth's atmosphere;
$F_m$=fade margin, an attenuation dependent on atmosphere and weather, ~14 for normal day;
$P_{Tx}$=power transmitted (dBm); and
RSSI=power received (RSSI value in dBm).
Putting in some values gives:

$$d = 10 \wedge \left[ \frac{30\ dBm - 14\ dB - (-60\ dBm) -}{10(2)\log(900\ MHz) + 30(2) - 32.44} \right]$$

or d=167.4 meters. The distance calculated from RSSI came out to be 167 meters, which may seem large relative to the gate distance computed above with respect to equations (1) and (2), but a course can be quite large with control towers holding the control signal transceivers cTx on the outer edges, while the drones pass through the gates in close proximity to the communication signal monitors vRx.

Figure 7:
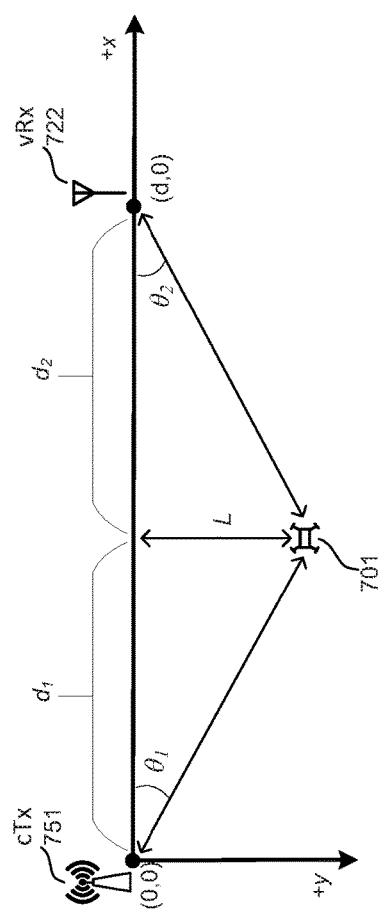
FIG. 7 is an example of the use of triangulation to determine a location of an object.
Figure 8B:
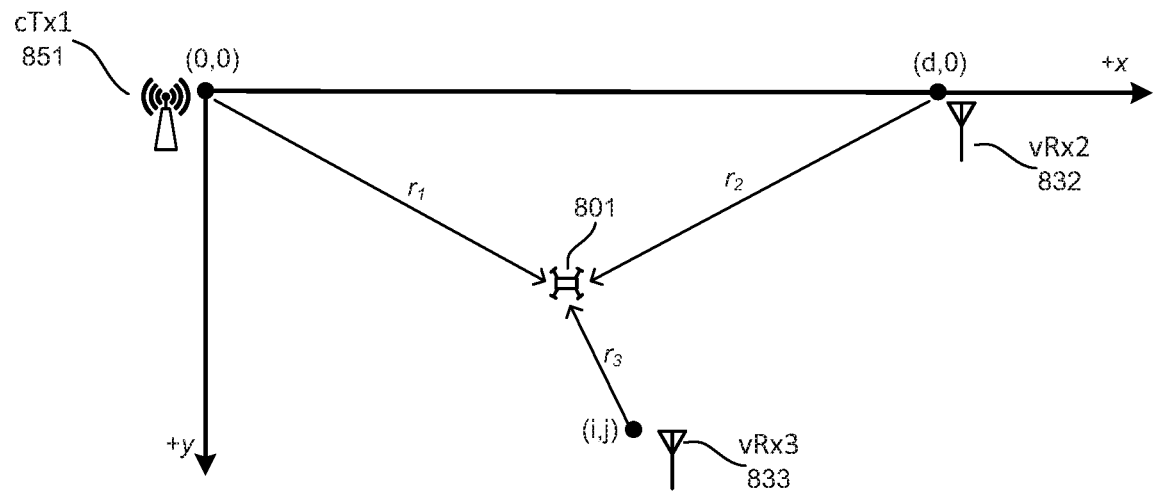
FIG. 8B illustrates an example of using trilateration to locate an object's position.
Figure 8A:
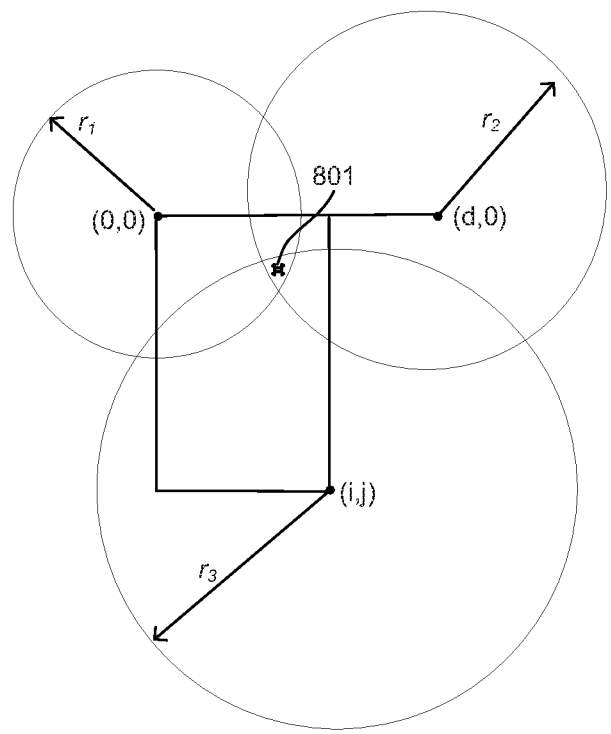
FIG. 8A illustrates the trilateration concept of using three known points.

When mapping locations there are several different methods to find an object's location based on known information. Triangulation and Trilateration are two methods to solve this problem. Triangulation utilizes angles in between observed locations of an object. FIG. 7 illustrates an example for finding the objects position based on triangulation and FIGS. 8A and 8B illustrate a trilateration example.

FIG. 7 is an example of the use of triangulation to determine the location a drone 701 flying on a gridded map. A control signal transceiver cTx1 751 and communication signal monitor vRx2 752 are respectively located at the points (0,0) and (d,0) along the x-axis, and where the positive y-axis is in the downward direction. The drone 701 is at a distance $d_1$ along the x-axis from control signal transceiver cTx1 751 and at a direction having an angle $\theta_1$ from the x-axis. Relative to the communication signal monitor vRx2 722, the drone is at an angel $\theta_2$ relative to the (negative) x-axis, and where the distance in the x-direction between the drone and the communication signal monitor vRx2 722 is d2. In the y-direction, the drone 701 is a distance L.

Applying basic trigonometry to FIG. 7 gives the equation:

$$d = \frac{L}{\tan\theta_1} + \frac{L}{\tan\theta_2} \rightarrow L = \frac{d\sin\theta_1\sin\theta_2}{\sin(\theta_1 + \theta_2)}, \quad (4)$$

where:
d=distance (meters) from observed points=$d_1+d_2$;
L=distance (meters) the object is from reference plane;
$\theta_1$=angle between first reference point and the object; and
$\theta_2$=angle between second reference point and the object.
Taking the values of $d_1$=12 m, $d_2$=13.5 m, and $\theta_1 \approx \theta_2 \approx 30°$ as an example, this gives L≈7.4 m. Consequently, the drone 701 is located at ≈(12 m,7.4 m).

Triangulation can pose challenges as the angles can change rapidly through a large range of values if the object is moving rapidly and passes close to one of the control signal transceivers or communication signal monitors, such as when a drone passes through a gate in the drone racing course example. Additionally, the reference plane to determine the distance L is defined by the location of the two components (control signal transceivers or communication signal monitors) used to calculate the location. An advantage of triangulation is that it only requires two components to calculate the value of L, making it useful in regions of a course that have limited components for reporting distance measurements.

Triangulation uses measurements from 2 points for determining a location, while trilateration uses three. Trilateration utilizes distances which can be easily broken into a grid map for calculation. By making a course map into a grid, the location of the tracking components can be placed and recorded on the grid. These can be used as anchor points, from three different system components can be used to output a distance value to calculate an object's 2D position on the course.

FIG. 8A illustrates the trilateration concept of using three known points (marked P1=(0,0), P2=(d,0), P3=(i,j)) along with known distances r1, r2, and r3. P1, for example, could be a control signal transceiver and points P2 and P3 are communication signal monitors. Distances r1, r2, and r3 can be determined from those known points, at which the system can use the systems of equations (5) to solve for the x and y location of the object 801 on the coordinate map:

$r_1^2 = x^2 + x^2 + z^2$;

$r_2^2 = (x-d)^2 + x^2 + z^2$; and $r_3^2 = (x-i)^2 + (x-j)^2 + z^2$. \quad (5)

As shown in FIG. 8A, the three circles typically will not meet at a single point, but define a region. Solving these equations for x and y gives:

$$x = \frac{r_1^2 - r_2^2 + d^2}{2d}, \quad y = \frac{r_1^2 - r_3^2 + i^2 + j^2}{2j} - \frac{i}{j}x \quad (6)$$

The equations of system (5) can also be solved for z and in some embodiments this data can be used in addition to the altitude sensor data from the object to determine a height value.

FIG. 8B illustrates a particular example of using trilateration to locate an object's (x,y) position. In this example a control signal transceiver cTx1 851 is located at P1=(0,0); a communication signal monitor vRx2 852 is located at P2=(20 m,0)=(d,0); and a communication signal monitor vRx3 853 is located at P3=(12 m,9 m)=(i,j). Putting these values into equations (6) above gives:

$$x = \frac{12^2 - 13.5^2 + 20^2}{2*20} = 9.04m;$$

$$y = \frac{(12^2 - 8^2 + 12^2 + 9^2)}{2*9} - \frac{12}{9} * 9.04 = 4.84m.$$

Consequently, the position of the object 801 in the coordinate system is (9.04 m, 4.84 m). Trilateration can be more accurate than the triangulation method, but needs three distance values reported from the system in order operate.

Figure 9:
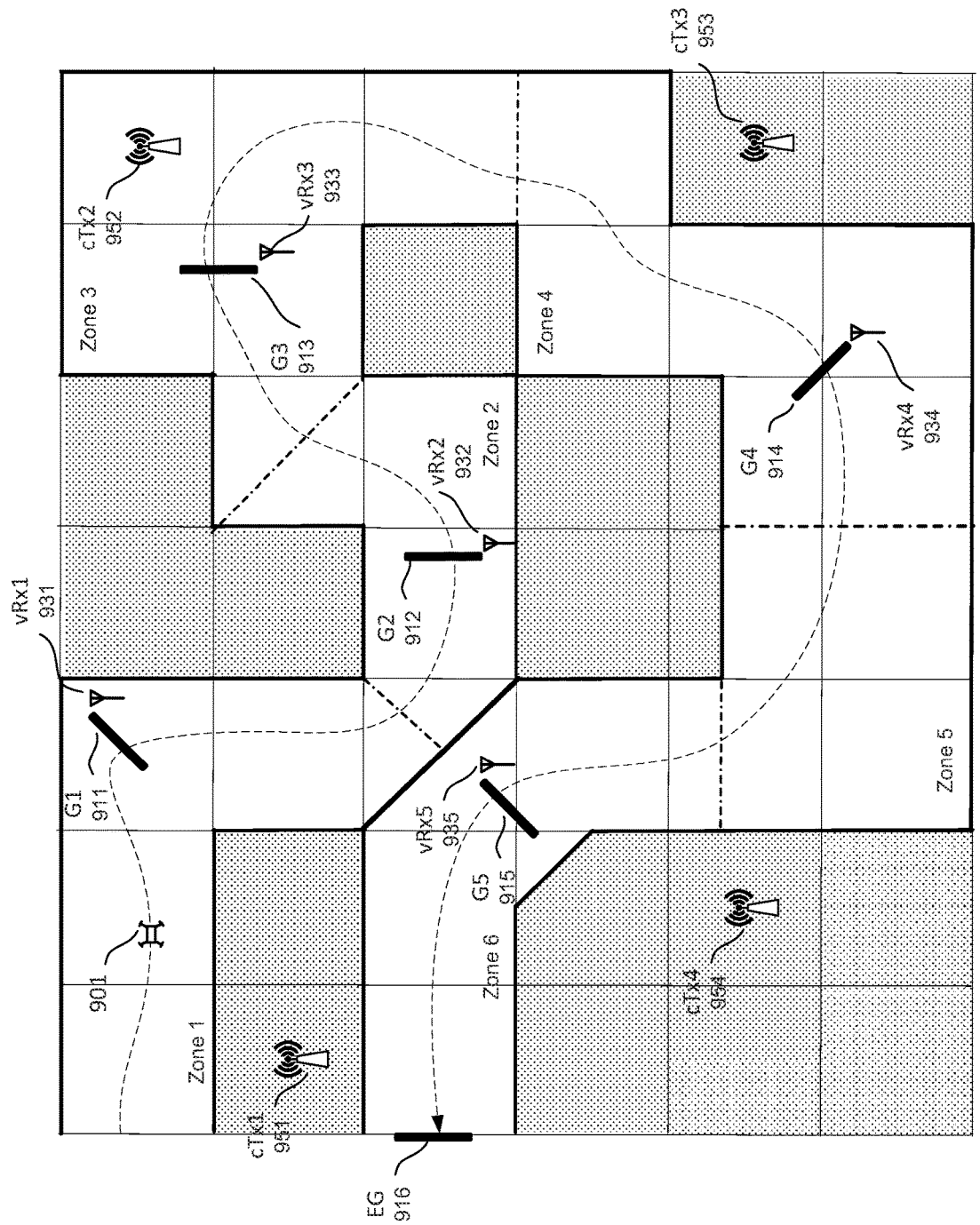
FIG. 9 displays a drone course cut into sections based on an x,y coordinate system to create a grid map.

Considering the data acquisition for the example of a drone racing course, FIG. 9 displays a course cut into sections based on an x,y coordinate system to create a grid map. FIG. 9 is a top view of the 2D data acquisition elements of the data that can be combined with altitude data to determine a 3D pathway. The course is defined within the larger region of the grid by the heavier lines and includes the gates G1-G5 911-915. The portions of the region outside of the course are stippled. A drone 901 is shown traveling along a path represented by the dashed line, moving from the Start and sequentially passing through the gates G1-G5 911-915 and on to the end gate EG 916.

In this example, a set of four control signal transceiver cTx1-cTx4 951-954 are located on the outskirts of the course and cover the region. Each of the gates G1-G5 911-915 has an associated communication signal monitor vRx1-vRx 921-925, respectively. The course is split into six zones 1-6, as demarcated by the broken lines. A tracking log gives the correspondence between the zones and which of the control signal transceivers and communication signal monitors provide coverage in the zone:

Zone 1: vRx1, cTx1
Zone 2: vRx2, cTx1, cTx2
Zone 3: vRx3, cTx2, cTx3
Zone 4: vRx4, cTx3
Zone 5: cTx3, cTx4
Zone 6: vRx5, cTx1, cTx4

This tracking log is based on the signals that are expected to be reliably strong enough in each zone. As Zone 2, 3 and 6 has three sources available, trilateration can be used for these zones. Zones 1, 4, and 5 each have only two reliable signal sources and use triangulation.

Figure 10:
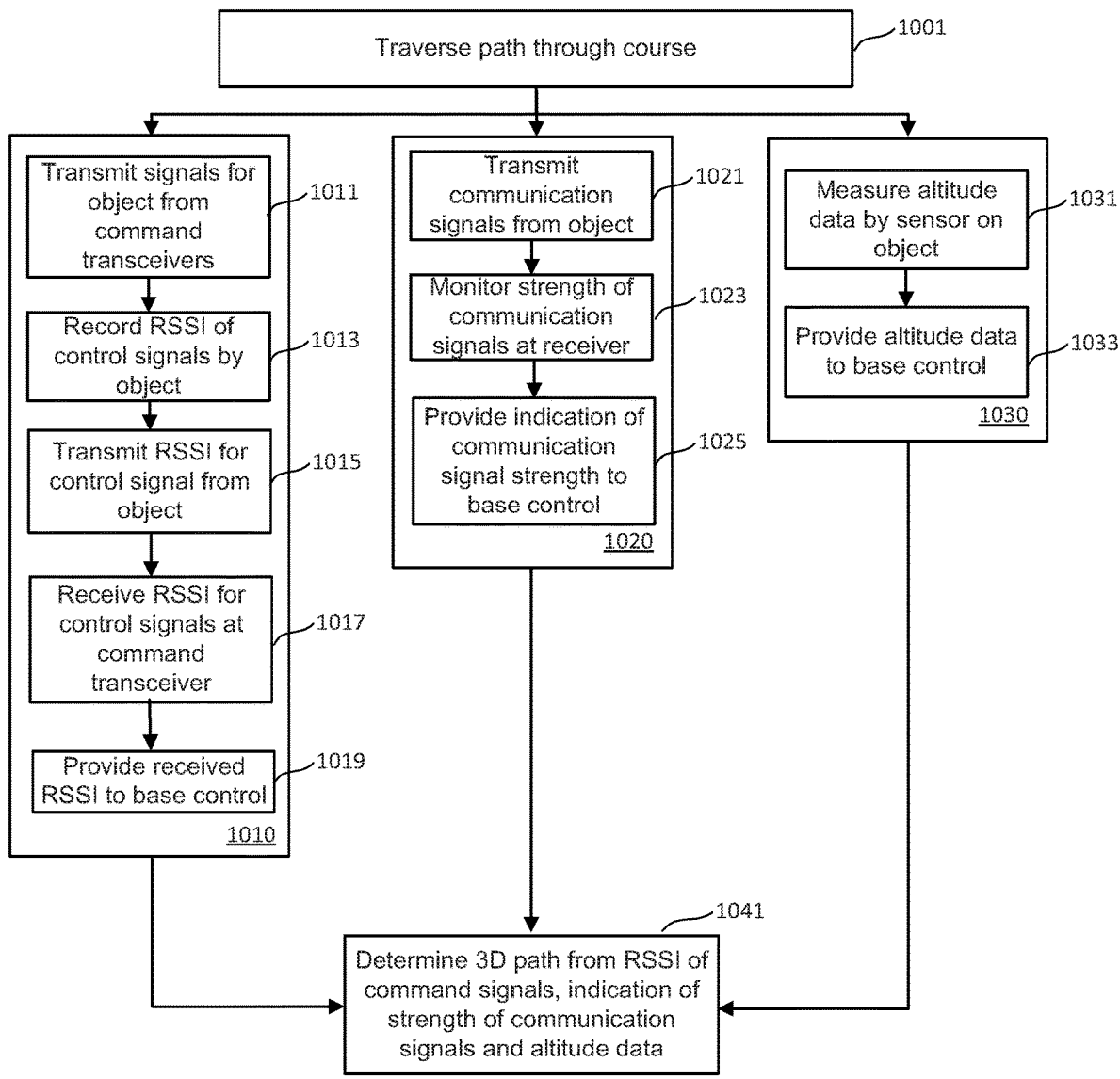
FIG. 10 is a flowchart describing one embodiment for acquiring the path data and determining a three dimensional path for an object moving through a course.

FIG. 10 is a flowchart describing one embodiment for acquiring the path data and determining a three dimensional path for an object moving through a course. Beginning at step 1001, the object traverses a path through the course. While travelling along the path, path data based on the control signals is obtained and provided to the base control at step 1010; path data based on the communication signals is obtained and provided to the base control at step 1020; and altitude data from object is obtained and provided to the base control at step 1030. The three sets of data are then combined in step 1041 by the base control at 1041. Each of steps 1010, 1020 and 1030 are performed as ongoing processes as the object moves through the course.

Looking at step 1010 in more detail, the control transceivers (cTx) provide the area containing the course with control signals for the object at step 1011. In the drone example, the control signals transmitted by the radio signals from the transceivers include the signals by which the pilot controls the speed and direction when flying the aircraft. At step 1013, the object receives the control signals and determines an indication of their received signal strength intensity (RSSI), which the object then transmits back to the control transceivers (cTx) at step 1015. The RSSI values can be given time stamps for use when combining with the other data sets for establishing the object's path. At step 1017 the control transceivers (cTx) receive the RSSI values, where these can be received at the same transceiver that transmitted the measured signal or a different transceiver. In some embodiments, the strength of the received signal from the object can also be used for determining the object's path. The RSSI values for the control transceivers is provided to the base control at step 1019.

Looking now at step 1020 in more detail, at step 1021 the object is transmitting communication signals as it travels the course. For the drone example, these can be the video signals transmitted from the drone for pilots to use. The communication monitor receivers (vRx) determine a measure of the received signal strength intensity (RSSI) at step 1023, with the values being provided to the base control at step 1025. More detail on step 1025 is described above with respect to FIGS. 5A and 5B. As all that is being determined at this point is the strength of the signal, it is not necessary to, for example, decode or otherwise further process this communication signal. The values supplied to the base control at step 1025 can again be time stamped to facilitate their combination with the other data sources.

For step 1030, at step 1031 the altitude sensor on the object measures the altitude as the object moves through the course. As discussed above, the altitude sensor can be an IR sensor, ping sensor, barometer, or other suitable sensor, where several different sensors can be used as these often have different relative advantages and disadvantages. At step 1033 the altitude data is provided to the base machine, where again this can be time stamped. The altitude data can be sent using the control transceivers (cTx) or other suitable receivers.

At step 1041, the data from steps 1010 and 1020 can be combined to determine a two dimensional projection of the object's path onto the x-y plane. The processing circuitry of the base control can combine these data using triangulation, trilateration, or a combination of these, such as described above with the tracking log for FIG. 10. If only two signals are available, triangulation can be used, while if three signals are available trilateration is typically preferred. If more than three reliable data sources are available, the best three (such as the strongest or most reliable) can be used for trilateration. The 2D path data can then be combined with the altitude data from 1030 to generate the 3D path.

Although presented mainly in the context of drones travelling through a closed or relatively compact course, the same or similar techniques can be applied to determining a three dimensional path of other objects. In addition to drones, these objects can include non-drone aircraft or even objects travelling on the ground in a non-flat region. For drones or other objects, the course need not be defined in terms of a set of gates that need to be passed through, but also less well defined course regions in which video or other communication signals from the object can be monitored for the intensity and which is covered by command transceivers in communication with the object.

Referring back to FIG. 9, in addition to the gates G1-G5 911-915 that a drone passes through on its path along the course, the end of the course includes an end gate EG 916. The end gate can be similar to the other gates or can incorporate a capture structure to catch the drone as they complete the circuit. For example, a heat of a drone race ends as the drones pass through or into the end gate structure, such as crashing into a capture structure included in the end gate. For example, in some embodiments the capture structure can be a large mesh enclosure to cushion impact as well as maintain safety.

Once a drone is in the capture structure, the drone remains "ON" until powered off. Relying on a technician or other person to manually turn off the drones can pose risks. Any time a drone is powered on it can still receive commands from pilots. Although pilots may be instructed, and not intending, to send commands, they can still have full control of the drone. For example, if someone accidentally knocked over a controller this could activate throttle and cause harm to someone handling the drone. Automatically powering down drones once they finish will maintain human safety.

The drones can also acquire damage from crashing into the end gate structure. When multiple drones crash into the end gate structure more or less simulataneously, not every pilot can be perfect when it comes to manually disarming the drone. This results in the propellers of the drones chewing each other up as well as physically damaging the end gate structure. Adding an automated power down sequence will also reduce physical damage to the drones and the end gate.

Figure 11A:
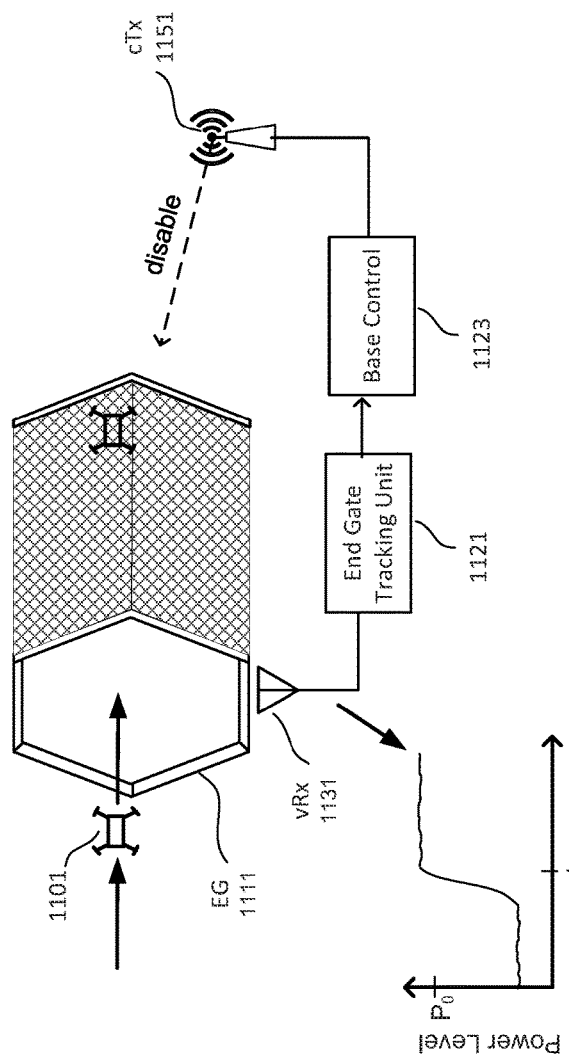
FIG. 11A is a block diagram for one embodiment of an end gate structure and system for the automatic disabling of a drone when it reaches the end gate structure.

FIG. 11A is a block diagram for one embodiment of an end gate structure and system for the automatic disabling of a drone when it reaches the end gate structure. As a drone 1101 completes the course it reaches the gate structure EG 1111, passing through the opening and into the capture structure, such as a mesh enclosure. The communication monitor receiver vRx 1131 monitors the received signal strength indication of the video or other communication signal and is connected to an end gate tracking unit 1121. The end gate tracking unit 1121 can be the same or similar to that described above for the (non-end) gates with respect to FIG. 4 and can track the communication signals from multiple drones or other objects. The tracking unit 1121 passes on an indication of the received signal strength indication to base control 1123 and, in response to this indicating that the drone is in the capture structure, has the control transceiver cTx 1151 transmit a disable signal to the drone.

In the case of a drone passing through a gate along the course, the received signal strength indication seen by the gate's associated communication monitor receiver's antenna will increase as the drone approaches the gate, peak as it passes through the gate, then drop off as the drone moves away, as discussed above with respect to FIG. 5A. For the end gate, as the drones crash into the end gate and are held in the capture structure, the strength of the signal seen by the communication monitor receiver will increase and stay at or near its peak value, indicating the drone is more or less stationary. This is represented in the time versus power curve at lower left in FIG. 11A, where as a drone approaches the end gate the power level rises above some threshold value $P_0$ at a time $t_0$, after which the power level stays high. After receiving this information, the base machine submits a command out to control transceivers to be transmitted by some or all of the command transceivers. At this point drones that have completed the race will receive the signal to shut down.

As a drone crashes into the end gate it will remain (for the most part) stationary. If a drone sits in the same location near the end gate's communication monitor receiver vRx 1131 for some amount of time, the communication monitor receiver vRx 1131 will see a more or less consistant communication signal power transmitted from the drone above the threshold level of $P_0$, as represented in the time versus power curve at lower left in FIG. 11A. This serves as the signature that the drone is in the end gate's capture structure.

Figure 11B:
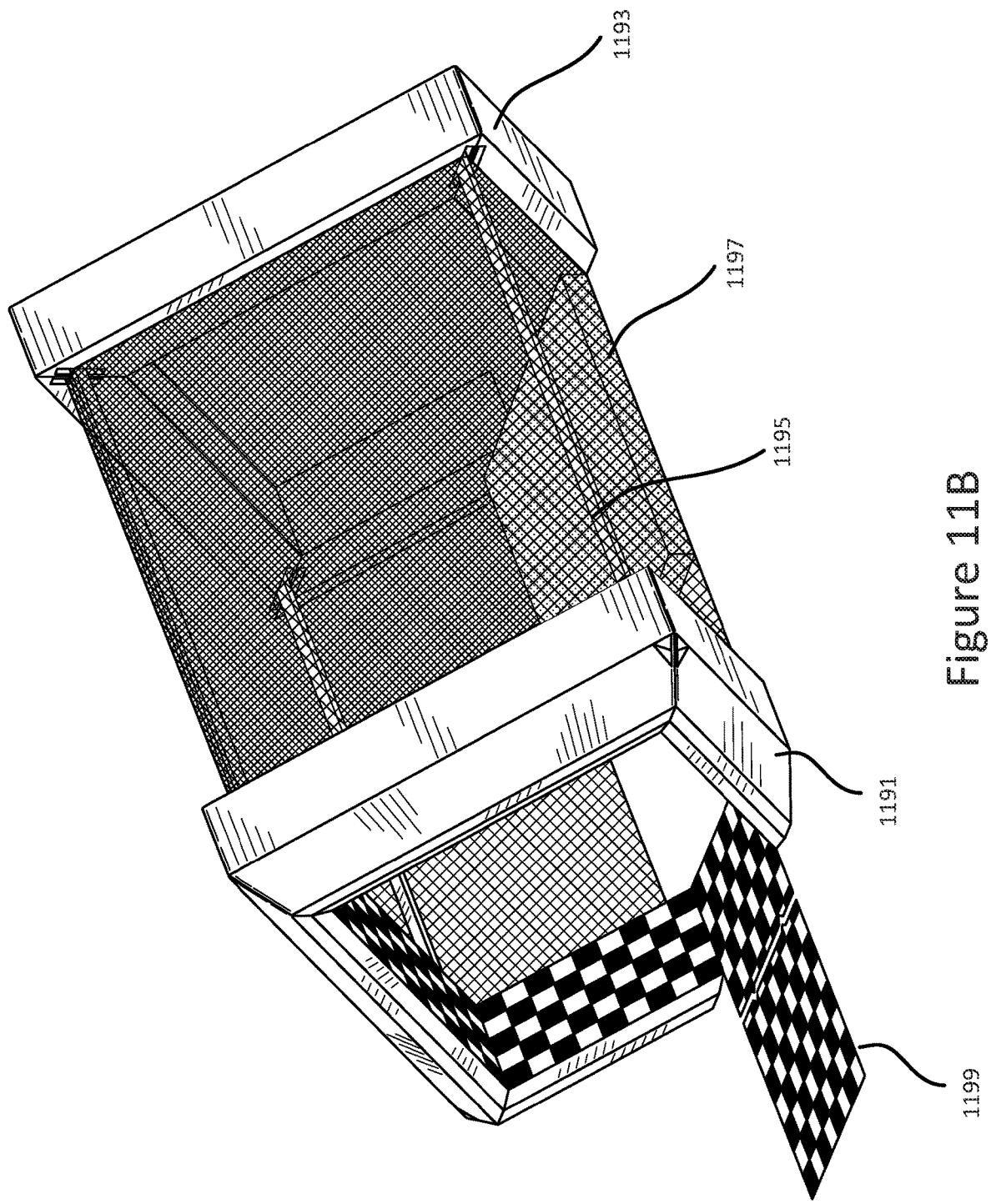
FIG. 11B is a more detailed view of one embodiment for an end gate structure.

FIG. 11B is a more detailed view for one embodiment of the end gate structure 1111 of FIG. 11A. A drone would complete the course by flying into a front opening 1191 of the gate, which can include marking, such as the shown checkered pattern and an apon 1199 for easier identification. A mesh capture structure is attached to the entrance 1191 and supported by a rear frame 1193 and supports 1195. To cushion the landing once a drone crashes into the net, a pad 1197 can be on the bottom of the capture structure.

Figure 12:
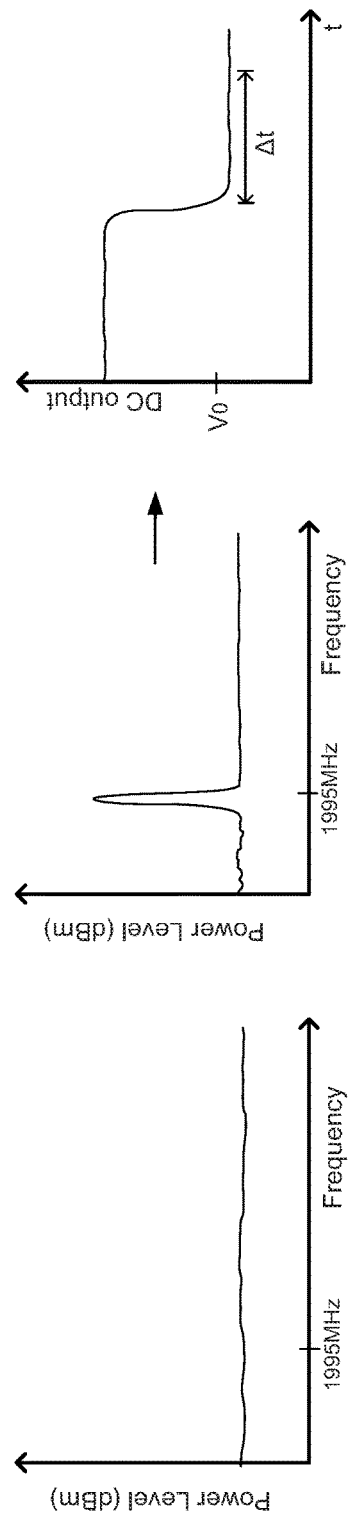
FIG. 12 illustrate a frequency versus power curve and time versus DC output curve for the end gate when a drone is captured.

FIG. 12 illustrates two frequency versus power curves and a time versus DC output curve for the end gate when a drone is captured. For example, if monitor receiver vRx 1131 is placed near the end gate EG 1111 the end gate tracking unit 1121 could see a power spike at the corresponding frequency as the drone enters the end gate. At left, FIG. 12 illustrates the frequency versus power curve before a drone approaches the end gate, showing a flat output. As the drone enters the gate, there is a peak at the frequency corresponding to the drone, in this example at 1995 MHz, as shown at center in FIG. 12. When tracking multiple drones or other objects, each would be assigned a distinct frequency and the disable signal would be transmitted to the corresponding drone. In one embodiment, the endgate tracking unit can use the same architecture as described above with respect to FIGS. 4 and 5 for the other gates. For the end gate, however, the sensing algorithm will see a near flat DC output value from the tracking unit once the drone is captured, as shown at right in FIG. 12. The tracking unit for the end gate can have a different algorithm than the (non-end) gate tracking units in that it will record and wait for drones to reach this DC output threshold to drop below some reference value, labelled $V_0$ in FIG. 12, for an amount of time greater than or equal to a specified time interval $\Delta t$. After that time has passed, the disable command signal will be sent out to the drones that have finished, powering them down and shutting off their signal transmissions.

Figure 13:
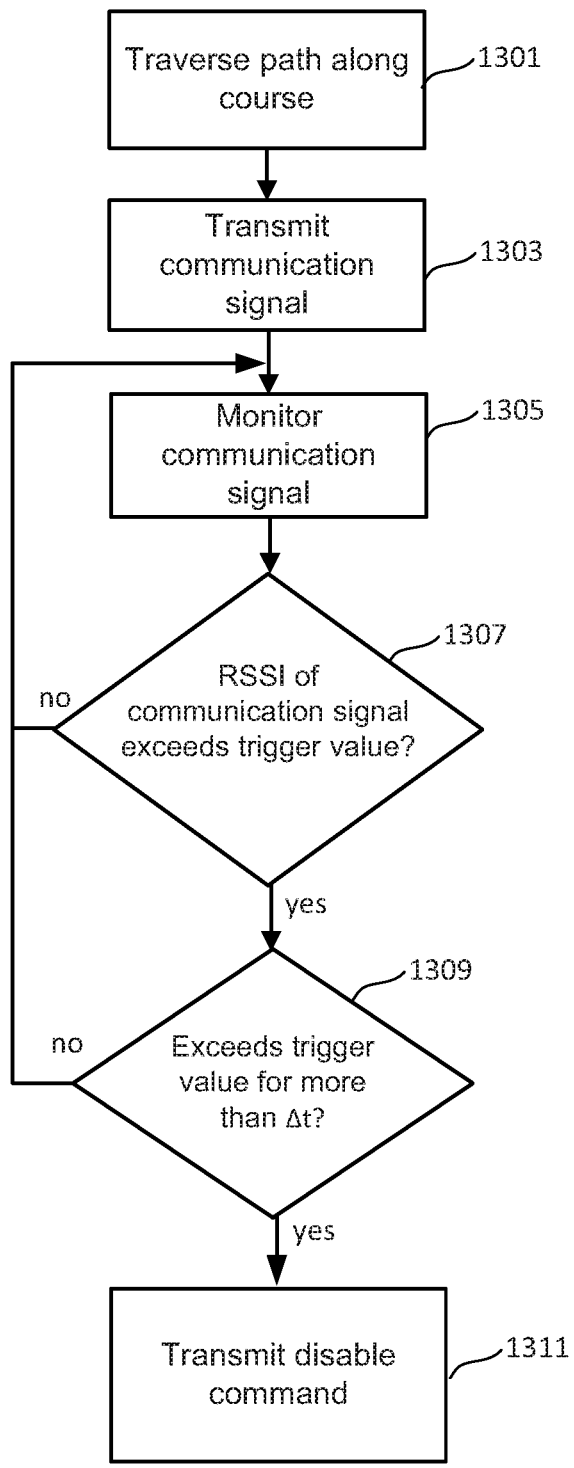
FIG. 13 is a flowchart describing one embodiment for the automatic disabling of a drone upon reaching the end gate structure.

FIG. 13 is a flowchart describing one embodiment for the automatic disabling of a drone upon reaching the end gate structure. The flow begins at step 1301 with the drone traversing a path along a course, during which it is transmitting communication signals (step 1303) that are monitored (step 1305) by the end gate's communication monitor receiver vRx 1121. This process is much the same as for the non-end gates as described above with respect to steps 1001 and 1020 in FIG. 10. The end gate's tracking unit 1121 receives the signals from the end gate's communication monitor receiver vRx 1121, which are passed on to the base control 1123 with its processing circuit, which is monitoring this input for the signature of a drone being captured in the end gate structure 1111.

At step 1307 the end gate tracking unit 1121 and base control 1123 monitor the communication signals received signal strength intensity and determine whether it exceeds a trigger reference value and, if not, continues monitoring. For the embodiment of the end gate tracking unit in the embodiment represented in the left portion of FIG. 12, the received signal strength intensity exceeding the reference value corresponds to the DC voltage received at the base control being below the reference value $V_0$. If the trigger reference value is exceeded at step 1307, at step 1309, it is determined whether it does so for more than the interval $\Delta t$. If not, the flow loops back to step 1305 to continuing monitoring the communication signal; if so, at step 1311 the control transceiver cTx 1151 transmit a disable signal to the drone.

More generally, the automatic disabling techniques can be extended to more general objects moving through a more general path. With or without an end gate having a capture structure, there may be circumstances when it is needed or convenient to disable an object when it reaches a certain point or region. By monitoring the received strength of video or other communication signals at the point or region similarly to the process described with respect to FIG. 13, a disable command can similar be sent to the object when it reaches the point or region.

One embodiment includes a system to determine a three dimensional path of an object, the system including a plurality of communication signal receivers, a plurality of command transceivers, one or more altitude data receivers, and one or more processing circuits. The communication signal receivers are configured to monitor a received strength of a communication signal transmitted by the object. The command transceivers are configured to receive a recorded strength signal indication transmitted from the object, the recorded strength signal indication corresponding to the strength of a control signal from the command transceivers as received by the object. The altitude data receivers are configured to receive altitude information from the object while travelling through the course. The processing circuits are connected to the communication signal receivers, command transceivers and altitude data receivers and configured to determine a three dimensional path of the object from the received strength of the communications signal, the recorded strength signal indications and the altitude information.

Embodiments also include a system having a mobile source, a plurality of signal monitors along a course, a plurality of antennae in a region including the course, one or more receivers, and one or more processing circuits. The mobile source is configured to transmit a communication signal, configured to receive control signals and transmit indications of a strength of the received control signals, and includes an altitude sensor configured to determine and transmit altitude information while travelling along a three dimensional path. The signal monitors are configured to monitor a received strength of the communication signal transmitted by the mobile source while travelling through the course. The antennae are configured to transmit the control signals and receive the indications of the strength of the received control signals from the mobile source while travelling through the course. The receivers are configured to receive the altitude information from the mobile source while travelling through the course. The processing circuits are connected to the signal monitors, antennae and receivers and configured to determine the three dimensional path of the mobile source through the course from the strength of the communications signal, the received strength of the control signal transmitted by the mobile source and the altitude information.

One set of embodiments are for a method that includes receiving an indication of a strength of a communication signal transmitted by a moving object and receiving recorded strength signal indications transmitted from the moving object, the recorded strength signal indications corresponding to the strength of command signals received by the moving object. The method also includes receiving altitude information from the moving object and determining a three dimensional path of the moving object from the strength of the communications signal, the recorded strength signal indications and the altitude information.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A system to determine a three dimensional path of an object, comprising:
   a plurality of communication signal receivers, the communication signal receivers configured to monitor a received strength of a communication signal transmitted by the object;
   a plurality of command transceivers, the command transceivers configured to receive a recorded strength signal indication transmitted from the object, the recorded strength signal indication corresponding to the strength of a control signal from the command transceivers as received by the object;
   one or more altitude data receivers configured to receive altitude information from the object; and
   one or more processing circuits connected to the communication signal receivers, command transceivers and altitude data receivers and configured to determine a three dimensional path of the object from a combination of the received strength of the communications signal, the recorded strength signal indications and the altitude information.

2. The system of claim 1, wherein the processing circuits are further configured to determine the three dimensional path by a triangulation process using a combination of the received strength of the communications signal from one of the communication signal receivers and the recorded strength signal indication from one of the command transceivers.

3. The system of claim 1, wherein the processing circuits are further configured to determine the three dimensional path by a trilateration process using a combination of the received strength of the communications signal from one or more of the communication signal receivers and the recorded strength signal indication from one or more of the command transceivers.

4. The system of claim 1, wherein the communication signal receivers are each associated with a corresponding gate through which the object passes and the strength of the communication signal transmitted by the object is the strength of the communication signal as the object passes through the gate.

5. The system of claim 1, wherein the object is a remote controlled aircraft and the control signals include signals for controlling the path of the object.

6. The system of claim 1, wherein the communication signal is a video signal.

7. The system of claim 1, wherein the received strength of the communications signal, the recorded strength signal indications and the altitude information received by the one or more processing circuits each include time stamp data.

8. A system, comprising:
a mobile source configured to transmit a communication signal, configured to receive control signals and transmit indications of a strength of the received control signals, and including an altitude sensor configured to determine and transmit altitude information while travelling along a three dimensional path;
a plurality of signal monitors along a course, the signal monitors configured to monitor a received strength of the communication signal transmitted by the mobile source while travelling through the course;
a plurality of antennae in a region including the course, the antennae configured to transmit the control signals and receive the indications of the strength of the received control signals from the mobile source while travelling through the course;
one or more receivers configured to receive the altitude information from the mobile source while travelling through the course; and
one or more processing circuits connected to the signal monitors, antennae and receivers and configured to determine the three dimensional path of the mobile source through the course from the strength of the communications signal, the received strength of the control signal transmitted by the mobile source and the altitude information.

9. The system of claim 8, wherein the processing circuits are further configured to determine the three dimensional path by a triangulation process using a combination of the strength of the communications signal from one of the communication signal monitors and the received strength of the control signal transmitted by the mobile source form one of the antennae.

10. The system of claim 8, wherein the processing circuits are further configured to determine the three dimensional path by a trilateration process using a combination of the strength of the communications signal from one or more of the communication signal monitors and the received strength of the control signal transmitted by the mobile source form one or more of the antennae.

11. The system of claim 8, wherein the signal monitors are each associated with a gate through which the mobile source passes when travelling through the course and the strength of the communication signal transmitted by the mobile source is the strength of the communication signal as the mobile source passes through the gate.

12. The system of claim 8, wherein the mobile source is a remote controlled aircraft and the control signals include signals for controlling the path of the mobile source.

13. The system of claim 8, wherein the communication signal is a video signal.

14. The system of claim 8, wherein the strength of the communications signal, the received strength of the control signal transmitted by the mobile source and the altitude information each include time stamp data.

15. The system of claim 8, wherein the altitude sensor is an infra-red sensor.

16. The system of claim 8, wherein the altitude sensor is a ping sensor.

17. The system of claim 8, wherein the altitude sensor is a barometer.

18. A method, comprising:
receiving an indication of a strength of a communication signal transmitted by a moving object;
receiving recorded strength signal indications transmitted from the moving object, the recorded strength signal indications corresponding to the strength of command signals received by the moving object;
receiving altitude information from the moving object; and
determining a three dimensional path of the moving object from a combination of the strength of the communications signal, the recorded strength signal indications and the altitude information.

19. The method of claim 18, wherein the strength of the communication signal is the strength of the communication signal as the moving object passes through a gate along a course.

20. The method of claim 18, wherein the moving object is a remote controlled aircraft.

* * * * *